United States Patent Office 3,501,546
Patented Mar. 17, 1970

3,501,546
PREPARATION OF PARAFFINIC HYDROCARBONS FROM ACYCLIC, MONOHYDRIC, PRIMARY ALKANOLS AND ALDEHYDES HAVING UP TO 24 CARBON ATOMS WITH A CATALYST CONSISTING OF PALLADIUM DISPERSED ON TITANIUM DIOXIDE
Michael Dubeck, Birmingham, and James G. Jolly, Lathrup Village, Mich., assignors to Ethyl Corporation, New York, N.Y., a corporation of Virginia
No Drawing. Filed Mar. 14, 1968, Ser. No. 712,907
Int. Cl. C07c 1/20
U.S. Cl. 260—676                    7 Claims

ABSTRACT OF THE DISCLOSURE

Alcohols and aldehydes are converted to hydrocarbons when contacted with a catalytic quantity of palladium on titanium dioxide. For example, n-dodecanol yields undecane and tricosane.

SUMMARY OF THE INVENTION

In essence, this invention comprises the discovery that palladium on titanium dioxide will catalyze the formation of hydrocarbons from alcohols and aldehydes. In many instances, two paraffins are obtained from an alcohol or aldehyde. Thus, for example, we can prepare undecane and tricosane from n-dodecanol. These hydrocarbons have $n-1$ and $2n-1$ carbons respectively where the number of carbons in the starting alcohol, or aldehyde) is $n$.

The alcohols employed have the group

bonded to an organic group. The organic group within the alcohol can have any configuration which yields a stable, unhindered and active reactant. A stable reactant does not decompose by extraneous side or competitive reactions under the reaction conditions employed, and the product produced therefrom is stable under said conditions to a significant extent. Reactants are unhindered when they are free of bulky substituents that unduly retard the process by steric hindrance. Active starting materials are those which do not contain any substituents which alter the course of the reaction by an undesirable amount of side reactions.

In general, the hydrocarbons produced by this process are known, and they have the many utilities known for them. Many of the hydrocarbon materials can be used as blending stocks in fuels. Many alkyl substituted aromatic compounds can be used as rejuvenants for Group VIII metal catalysts which are used to isomerize olefins. Many of the compounds can be used as coolants as described in U.S. 2,493,917. Many of the products having alkyl chains can be treated according to U.S. 3,322,849 and 3,293,318 to produce olefinic materials which can undergo reactions known for olefins. Compounds produced by this process can be used as solvents and as chemical intermediates. Moreover, long chain paraffins produced by this process can be used as waxes to coat papers and other substrates to make them less permeable.

DESCRIPTION OF PREFERRED EMBODIMENTS

This invention can be illustrated by a preferred embodiment which is a process for preparing a paraffin from an alcohol, said process comprising contacting an acyclic monohydric terminal primary alkanol (or aldehyde) having up to about 24 carbon atoms with a catalyst consisting essentially of from about 0.05 to about 5.0 weight percent of palladium dispersed on titanium dioxide, said process being conducted at a temperature from about 180° C. to about 275° C.; the amount of catalyst being from about 0.1 to about 5 parts by weight per each part by weight of said alcohol.

The reaction is not completely understood. However, the preparation of hydrocarbons having $2n-1$ carbon atoms from an alcohol having $n$ carbons can be rationalized by the following reaction sequence. However, this invention is not limited or bound in any way by any theory.

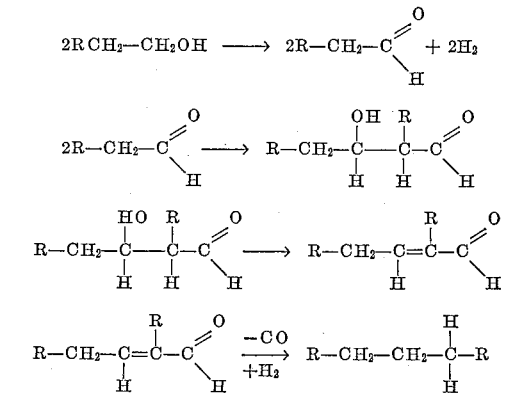

The two carbon-containing group —CH$_2$—CH$_2$OH can be bonded to hydrogen (ethanol) or an organic group. We are unaware of any critical limitation in the size of the organic group. However, for economic considerations we prefer alcohols having an organic group of up to about 24 and more preferably up to 18 carbon atoms. The organic group can be substituted with functional groups (which do not contain carbon and hydrogen) that do not interfere with the process. However, we prefer to use hydrocarbyl organic groups, that is, organic groups composed solely of carbon and hydrogen.

The organic group may be selected from a wide variety of radicals, for example, alkyl, cycloalkyl, aralkyl, and alkaryl radicals. Typical cycloalkyl radicals are cyclohexyl, 2-methylcyclohexyl, 4-decyclcyclohexyl, and the like. Typical aryl radicals are o, m, and p-tolyl and o, m, and p xylyl; the latter are radicals having the formula (CH$_3$)(CH$_3$)(C$_6$H$_3$—). Other alkaryl radicals which can be used are pentamethylphenyl and n-octylphenyl. Typical aralkyl radicals are benzyl, β-phenylethyl, 9-phenyldecyl and the like. Similarly, the organic group may be the biphenylyl radical and alkyl substituted biphenylyl radicals.

Preferably, the organic group is paraffinic and in a highly preferred embodiment we use acyclic, terminal, primary alcohols. Monohydric alcohols of this type are most preferred. These can be represented by the formula R—CH$_2$—CH$_2$OH wherein R is hydrogen or an acyclic paraffinic (alkyl) radical, either straight or branched chain having up to about 22 carbon atoms. Typical alcohols of this type are n-propanol, 6,6-dimethylheptanol-1, lauryl alcohol and n-tetracosanol-1. A highly preferred alcohol is n-dodecanol.

The catalyst can be prepared by any one of the many methods known to catalyst manufacturers. For example, the titanium dioxide may be merely impregnated with a solution of a soluble salt of palladium followed by calcining to decompose the salt to the free metal. This method of preparation of the catalyst is illustrated by the following example.

Example I 5.0 percent Pd on $TiO_2$.—A palladium complex solution was prepared by dissolving 8.33 g. $PdCl_2$ in 150 ml. concentrated $NH_4OH$ solution. This solution was added to 100 g. of titania support and these components were mixed and evaporated in a rotary evaporator at $<85°$ C. until dry. The impregnated pellets were heated in a furnace for two hours at 500° C. and then one hour at 600° C.

1.0 percent Pd on $TiO_2$.—A palladium complex solution was prepared by dissolving 1.66 g. $PdCl_2$ in 50 ml. concentrated $NH_4OH$ solution. This solution was added to 100 g. of titania support. After some drying on a rotary evaporator, the impregnated material was heated at 500° C. for two hours.

0.5 percent Pd on $TiO_2$.—Following the procedure above, a third catalyst preparation was made using 0.83 g. $PdCl_2$ in 75 cc. concentrated $NH_4OH$ solution and 100 g. titania. The palladium-ammonia complex on titania was decomposed at 500° C. for two hours, yielding the finished catalyst.

In a similar manner the relative amounts of titania and soluble palladium salt can be varied to prepare catalysts having from about 0.05 to about 5.0 weight percent of palladium dispersed on the titanium dioxide.

The reaction temperature is not critical. The process is carried out at a temperature from about 140° to about 290° C. A highly preferred reaction temperature is from about 180° to about 275° C.

Atmospheric pressure, or higher or lower pressures, can be employed. In general, a preferred pressure range is from about 0.1 to about 20 atmospheres; a most preferred range being from 1 to about 15 atmospheres: In short, reaction pressure is not critical.

The reaction temperature is not critical. The process but is dependent at least to some extent on the other process conditions employed. In general, higher temperatures usually result in a decrease of reaction time. Furthermore, the reaction time depends on the amount of the catalyst used for a given amount of reactants and on the specific metal catalyst since some catalysts are more active than others. When carrying out the process as a batch operation, reaction times of from about 2 to about 40 hours are usually sufficient.

The amount of catalyst employed in this process is not critical. However, it is preferred that an amount of catalyst be used which affords a reasonable reaction rate. In general, when the process of this invention is carried out as a batch operation, from about 0.01 to about 10 parts by weight of catalyst (consisting of a metal on a support is employed) per each 10 parts of aldehyde plus alcohol. A preferred range is from about 0.1 to about 5 parts by weight.

The process of this invention can be carried out as a batch process or as a continuous operation. In a continuous process, the reactants either in vapor or in liquid phase, are contacted with the catalyst. For practical reasons, liquid phase operations are preferred. When carrying out the process of this invention as a batch operation, it is preferred that a liquid phase be present.

A very important feature of this invention is the fact that the catalyst employed in this process may be re-used and, thus, improve the economics of the process.

Solvents which may be employed (in batch operations) should be inert under the reaction conditions. Non-aqueous materials such as the saturated hydrocarbons, e.g., pentane, hexane, isopentane, dodecane, ligroin, No. 9 oil, and the like are preferred.

The process of this invention may be carried out in an inert atmosphere. Nitrogen is preferred, mainly for economical reasons; however, other inert gases may be used with equal success.

When the process of this invention is a continuous process, an additional variable of space velocity is introduced. Space velocity may be defined by the following relationship:

$$\text{Space velocity (s.v.)} = \frac{\text{ml. reactants injected/ml. catalyst}}{\text{hours}}$$

The above formula for calculating space velocity holds whether the reactants are in liquid or gas phase. The value for space velocity, however, will be substantially different when the alcohol is in one or the other physical state. For example, when the reactants are injected in a liquid state, space velocity generally is in the range of from 0.1 to about 10, and more preferably, from 0.5 to about 3. On the other hand, when the reactant is in a gaseous state, space velocity is in the range of from about 50 to about 500. The reason for the difference in the values for space velocity is that there is substantially much less reactant in each milliliter of reactant in a gaseous state than in each milliliter in a liquid state.

Space velocity is thus a measure of the speed with which reactants are passed through the reaction tube containing the catalyst bed. Space velocity in a continuous process, similarly as the reaction time in a batch process, is not a directly independent variable. It depends on the reaction temperature, the activity of a particular catalyst employed, and the degree of reactivity inherent in the reactants. In order to achieve a given amount of reaction, the space velocity generally may be different for different catalysts even if all other variables remain constant.

In a continuous process, occasionally a single pass of reactants through the reaction column might not yield the desired degree of reaction. In such cases, the partially reacted material can be recycled.

Example II n-Dodecyl alcohol, 0.382 gram per minute, was fed to a hot tube reactor packed with 40 cc. of 0.5 percent palladium on titanium dioxide catalyst. The center of the catalyst bed was maintained at 246° C. for the entire feed time of 52 minutes. There was steady gas evolution until near the end of the feed period. The liquid product was obtained at the downstream end of the tube. Analysis estimated by vapor phase chromatographic inspection indicated that the product collected contained 50 percent unreacted n-dodecanol, 15 percent undecane, 20 percent tricosane, and 10 percent unknown material.

Example III n-Dodecyl alcohol, 0.428 gram per minute, was fed to the same catalyst bed employed in Example II. The temperature of the center of the catalyst bed was increased from 171° to 219° C. and samples were obtained. The sample taken at 196° C.—by vapor phase chromatographic estimate—contained 70 percent unreacted dodecanol, 20 percent undecane, and 10 percent tricosane.

By the same method the sample was taken at 219° C. was estimated to contain 80 percent unreacted dodecanol, 8 percent undecane, and 8 percent tricoscane.

Example IV n-Dodecanol was fed to a hot tube reactor packed with 0.5 percent palladium on titanium dioxide catalyst. Liquid condensate was obtained at 200° C. The feed rate was reduced to 0.375 gram per minute and gas evolved at a slow rate. At this feed rate, the temperature was increased to 225° C. and additional condensate collected. A gas sample was obtained during collection at 225° C. Mass spectrographic analysis of the gas sample indicated that the gas contained 3.2 mole percent carbon monoxide and 7.6 mole percent carbon dioxide. (The sample was not analyzed for hydrogen.) At 245° C. another gas sample was taken. Analysis indicated 13.9 mole percent hydrogen, 4.3 mole percent carbon monoxide and 1.8 mole percent carbon dioxide.

The following examples are conducted using the procedure of Example II. The catalysts are defined as weight percent palladium of titanium dioxide. Thus, in Example VI where it says "0.05" this means the catalyst is 0.05 percent palladium on titanium. In the examples, LHSV stands for Liquid Hourly Space Velocity.

Example V

Starting material—ethanol
Catalyst—0.05
Reaction conditions—200° C. and LHSV 1
Product—methane and propane Example VI Starting material—n-octanol
Catalyst—0.08
Reaction conditions—200° C. and LHSV 1.5
Product—heptane and heneicosane Example VII Starting material—β-phenylethanol
Catalyst—1.0
Reaction conditions—180° and LHSV 0.8
Product—toluene and 1,3-diphenyl propane Example VIII Starting material—β-cyclohexylethanol
Catalyst—2.0
Reaction conditions—275° C. and LHSV 2.5
Product—cyclohexylmethane and 1,3-dicyclohexylpropane In a similar manner, $C_{23}H_{48}$ and $C_{47}H_{96}$ are produced by reacting $C_{24}H_{47}OH$. Likewise, n-octadecanol yields $C_{17}H_{36}$ and $C_{35}H_{72}$.

The above examples can be essentially repeated by using a batch process in a reaction vessel rather than by passing the alcohol through a packed reaction tube. Thus, the above examples can be repeated by merely admixing the alcohol in a reaction vessel with from 0.1 to about 5 parts by weight of catalyst per each 10 parts by weight of alcohol. Where the reaction is conducted above the normal boiling point of the alcohol, the process can be carried out in an autoclave at the pressure required to give the desired temperature.

The process of this invention is best carried out in the absence of oxygen. The reaction vessel or reaction tube employed in the process is preferably flushed with nitrogen prior to carrying out the process.

Spent catalysts can be regenerated by heating to 400–500° C., preferably in a nitrogen atmosphere. There is a necessary coaction between the palladium and the titania support. Pure tatanium dioxide, palladium on charcoal and palladium on alumina do not give the same product as palladium on titania.

The process of this invention can afford hydrocarbons from aldehydes. The aldehydes have the configuration

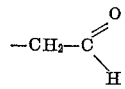

bonded to hydrogen or a stable, active, unhindered, organic group (such as the types bonded to the

group) as described above.

In general, the reaction conditions are the same as described above when discussing the reaction of alcohols; thus, they need not be repeated here. However, there is a noteworthy difference in the product obtained. Specifically, the aldehydes form the same materials the alcohols do plus olefin having $2n-1$ carbons atoms—when the number of carbon atoms in the starting aldheyde is $n$. Thus, when the aldehyde analogous to the alcohols employed in preceding examples is reacted as described therein the same products are obtained as set forth therein together with olefin having $2n-1$ carbons.

The following example is illustrative.

Example IX

Dodecyl aldehyde (0.40 g./min.) was fed with a Sage syringe pump to a hot tube reactor packed wtih a 0.5 percent Pd on $TiO_2$ catalyst bed. The reactor was washed out with ether (500 cc.) before this experiment and a final 100 cc. ether wash when evaporated to dryness was free of any residue. The aldehyde was initially fed to the catalyst bed at 162° C. and then the bed was heated to 200° C. Steady gas evolution was observed at 200° C. and liquid samples were obtained. After heating to 246° C. a second sample of feed condensate was obtained. During the entire period of aldehyde feed (162 to 246° C.) the discharged gas was collected for mass spectrographic analysis and results are reported below. VPC analysis of the product samples is given below.

GAS ANALYSIS

Mole percent:
$H_2$ ---------------------------------- 2.9
CO ---------------------------------- 13.7
$CO_2$ ---------------------------------- 6.0

PRODUCT ANALYSIS BY VPC INSPECTION

|  | Percent |
| --- | --- |
| Dodecyl aldehyde | 5 |
| Undecane | 10 |
| Tricosane | 65 |
| Trisosene | 15 |

In the reaction of aldehydes and alcohols, the addition of 0.1 to 5 parts by weight water (per part by weight alcohol or aldehyde) is beneficial. More specifically, it favors production of products having $2n-1$ carbons where the starting material has $n$ carbons. It also—to some extent—lowers the temperature at which these products are formed.

Having fully described the process of this invention, the products produced thereby and their utilities, it is desired that this invention be solely limited by the lawful extent of the appended claims.

We claim:

1. Process for preparing a paraffin, said process comprising contacting a reactant selected from acyclic, monohydric, terminal, primary alkanols and aldehydes having up to about 24 carbon atoms with a catalyst consisting of from about 0.05 to about 5.0 weight percent of palladium dispersed on titanium dioxide, said process being conducted at a temperature from about 180° C. to about 275° C.; the amount of catalyst being from about 0.1 to about 5 parts by weight per each part by weight of said alcohol.

2. Process of claim 1 wherein n-dodecanol is contacted with 0.05 to 5.0 weight percent palladium on titanium dioxide at a temperature of from about 190° to about 255° C.

3. Process of claim 1 wherein lauryl aldehyde is contacted with 0.05 to 5.0 weight percent palladium on titanium dioxide at a temperature of from about 190° to about 255° C.

4. Process of claim 1 being further defined in that said alkanols and aldehydes have up to about 18 carbon atoms.

5. Process of claim 1 wherein said reactant is selected from acyclic, monohydric, terminal, primary alkanols.

6. Process of claim 1 wherein said reactant is selected from acyclic, monohydric, terminal primary aldehydes.

7. Process of claim 1 wherein said catalyst is 0.5 weight percent palladium dispersed on titanium dioxide.

References Cited

UNITED STATES PATENTS 2,512,649   6/1950   Howard et al. _____ 260—676

OTHER REFERENCES

"Catalytic Conversion of Alcohols Into Aldehydes, Paraffins and Olefins" by Elmer J. Badin, J.A.C.S., vol. 65, pp. 809–13 (1943).

PAUL M. COUGHLAN, Jr., Primary Examiner
J. M. NELSON, Assistant Examiner

U.S. Cl. X.R.

260—666, 668, 682